US012320310B2

(12) United States Patent
Lohmann

(10) Patent No.: US 12,320,310 B2
(45) Date of Patent: Jun. 3, 2025

(54) WORK VEHICLE COMPRESSION IGNITION POWER SYSTEM HAVING THERMALLY STRATIFIED ENGINE COMBUSTION CHAMBERS

(71) Applicant: Deere & Company, Moline, IL (US)

(72) Inventor: Craig W. Lohmann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/977,016

(22) Filed: Oct. 31, 2022

(65) Prior Publication Data

US 2024/0141844 A1 May 2, 2024

(51) Int. Cl.
*F02D 41/00* (2006.01)
*F02D 13/02* (2006.01)
(Continued)

(52) U.S. Cl.
CPC ....... *F02D 41/006* (2013.01); *F02D 13/0269* (2013.01); *F02D 13/0273* (2013.01);
(Continued)

(58) Field of Classification Search
None
See application file for complete search history.

(56) References Cited

U.S. PATENT DOCUMENTS 3,266,234 A * 8/1966 Cook ........................ F02M 1/00 123/295
4,561,253 A * 12/1985 Curtil .................... F01L 13/085 123/90.6
(Continued)

FOREIGN PATENT DOCUMENTS

BR 102023023482 A2 7/2024
CN 1079533 A * 12/1993 ................ F01L 9/04
(Continued)

OTHER PUBLICATIONS

Non-Final Office Action issued in US Utility U.S. Appl. No. 18/177,514 dated Jun. 27, 2023 (58 pages).
(Continued)

*Primary Examiner* — Kevin R Steckbauer
(74) *Attorney, Agent, or Firm* — KLINTWORTH & ROZENBLAT IP LLP

(57) ABSTRACT

A power system includes an intake arrangement and a compression ignition engine including piston-cylinder sets. Each piston-cylinder set includes: a cylinder; a piston positioned within the cylinder to form a combustion chamber in between; an intake valve configured to open and close the intake port; an exhaust valve configured to open and close the exhaust port; and a fuel injector. During an exhaust stroke, the exhaust valve is opened to enable exhaust gas to flow out; during an initial portion of an intake stroke, the intake valve is opened to enable the intake air to flow into the combustion chamber, and during a further portion of the intake stroke, the intake valve is closed and the exhaust valve is opened to enable a portion of the exhaust gas to flow back into the combustion chamber in order to create thermally stratified layers of intake gas and exhaust gas.

20 Claims, 7 Drawing Sheets

(51) Int. Cl.

| | |
|---|---|
| ***F02M 26/00*** | (2016.01) |
| ***F02M 26/01*** | (2016.01) |
| ***F02M 26/03*** | (2016.01) |
| ***F02M 26/04*** | (2016.01) |
| ***F02M 26/10*** | (2016.01) |
| ***F02M 26/30*** | (2016.01) |

(52) U.S. Cl.
CPC ............ *F02M 26/01* (2016.02); *F02M 26/03* (2016.02); *F02M 26/04* (2016.02); *F02M 26/10* (2016.02); *F02M 26/30* (2016.02); *F01L 2800/10* (2013.01); *F02M 2026/002* (2016.02); *F02M 2700/31* (2013.01)

(56) References Cited

U.S. PATENT DOCUMENTS

| | | | | | |
|---|---|---|---|---|---|
| 5,203,830 | A * | 4/1993 | Faletti | F01L 9/20 | 123/90.11 |
| 6,276,334 | B1 * | 8/2001 | Flynn | F02B 29/00 | 701/102 |
| 6,321,699 | B1 | 11/2001 | Britton | | |
| 6,601,563 | B2 * | 8/2003 | Funke | F02D 13/04 | 123/321 |
| 7,004,125 | B2 * | 2/2006 | Asada | F02M 26/01 | 123/316 |
| 7,152,559 | B2 * | 12/2006 | Kuo | F02D 13/0207 | 123/90.15 |
| 7,228,839 | B2 * | 6/2007 | Kuo | F02D 41/006 | 123/294 |
| 7,347,171 | B2 * | 3/2008 | Leman | F02D 13/0226 | 123/90.15 |
| 7,628,013 | B2 * | 12/2009 | Aikawa | F02B 77/085 | 123/90.11 |
| 7,765,994 | B2 * | 8/2010 | Winstead | F02D 41/0087 | 123/58.8 |
| 8,150,582 | B2 * | 4/2012 | Blommer | B62D 5/0472 | 701/44 |
| 8,406,956 | B2 * | 3/2013 | Wey | B62D 6/00 | 180/443 |
| 8,474,258 | B2 | 7/2013 | Mahakul et al. | | |
| 8,522,756 | B2 | 9/2013 | Vuk et al. | | |
| 8,590,517 | B2 * | 11/2013 | Yokoo | F02M 26/01 | 123/568.14 |
| 8,930,118 | B2 * | 1/2015 | Nagatsu | F02D 13/0273 | 123/90.15 |
| 9,316,180 | B2 | 4/2016 | Heiermann | | |
| 9,512,814 | B2 * | 12/2016 | Yamakawa | F02D 41/3041 | |
| 9,835,065 | B2 * | 12/2017 | Jozsa | F01N 13/0093 | |
| 9,845,109 | B2 * | 12/2017 | George | B62D 6/006 | |
| 9,903,262 | B2 | 2/2018 | Edwards et al. | | |
| 10,487,753 | B2 * | 11/2019 | Idicheria | F02D 41/402 | |
| 10,648,443 | B1 * | 5/2020 | Inoue | F02B 11/00 | |
| 10,704,436 | B2 * | 7/2020 | Jozsa | F02D 41/0087 | |
| 10,801,430 | B2 * | 10/2020 | McCarthy, Jr. | F02D 13/0215 | |
| 11,199,162 | B2 * | 12/2021 | McCarthy, Jr. | F02D 41/0087 | |
| 11,305,813 | B2 * | 4/2022 | Kim | B62D 5/0463 | |
| 11,536,213 | B2 | 12/2022 | Miles et al. | | |
| 11,572,673 | B2 | 2/2023 | Dou et al. | | |
| 11,572,824 | B2 | 2/2023 | Miles et al. | | |
| 11,795,869 | B1 | 10/2023 | Lohmann et al. | | |
| 12,024,247 | B2 * | 7/2024 | Schäfer | B62D 5/0481 | |
| 2003/0200942 | A1 | 10/2003 | Dachtchenko et al. | | |
| 2004/0045283 | A1 * | 3/2004 | Asada | F02D 41/0002 | 60/285 |
| 2005/0252464 | A1 * | 11/2005 | Aikawa | F02B 77/086 | 123/58.8 |
| 2006/0016417 | A1 * | 1/2006 | Kuo | F02D 13/0273 | 123/294 |
| 2006/0016420 | A1 * | 1/2006 | Kuo | F02D 13/0273 | 123/299 |
| 2006/0086560 | A1 * | 4/2006 | Furusho | B62D 5/0463 | 180/446 |
| 2007/0119422 | A1 * | 5/2007 | Lewis | F02M 25/10 | 123/295 |
| 2007/0204747 | A1 | 9/2007 | Aoyama et al. | | |
| 2007/0295290 | A1 | 12/2007 | Cao | | |
| 2007/0295316 | A1 | 12/2007 | Davis et al. | | |
| 2008/0288157 | A1 * | 11/2008 | Winsor | F02B 33/38 | 60/299 |
| 2010/0211264 | A1 * | 8/2010 | Wey | B62D 6/00 | 701/41 |
| 2010/0268422 | A1 * | 10/2010 | Blommer | B62D 5/0472 | 701/44 |
| 2011/0247584 | A1 * | 10/2011 | Gentile | F02M 69/042 | 123/294 |
| 2011/0315128 | A1 * | 12/2011 | Yokoo | F02M 26/01 | 123/568.11 |
| 2013/0019828 | A1 * | 1/2013 | Nagatsu | F02D 41/006 | 123/90.15 |
| 2013/0047958 | A1 * | 2/2013 | Yamakawa | F02D 13/0273 | 60/285 |
| 2013/0180485 | A1 | 7/2013 | Kamio | | |
| 2015/0040560 | A1 * | 2/2015 | Jozsa | F02D 41/0065 | 60/285 |
| 2015/0300284 | A1 * | 10/2015 | Ishida | F02B 25/04 | 123/300 |
| 2015/0330315 | A1 | 11/2015 | Takahashi et al. | | |
| 2015/0354437 | A1 * | 12/2015 | Mulye | F02M 31/20 | 123/25 C |
| 2016/0010576 | A1 | 1/2016 | Primus et al. | | |
| 2016/0280251 | A1 * | 9/2016 | George | B62D 6/006 | |
| 2017/0101941 | A1 | 4/2017 | Gladel et al. | | |
| 2018/0009443 | A1 * | 1/2018 | Norstad | B62D 5/0463 | |
| 2018/0058285 | A1 * | 3/2018 | Jozsa | F02D 41/024 | |
| 2018/0106204 | A1 * | 4/2018 | McCarthy, Jr. | F02D 13/06 | |
| 2018/0306098 | A1 | 10/2018 | Edwards et al. | | |
| 2018/0347476 | A1 * | 12/2018 | Idicheria | H05H 1/46 | |
| 2019/0040826 | A1 * | 2/2019 | McCarthy, Jr. | F02D 41/0077 | |
| 2019/0389509 | A1 * | 12/2019 | Kim | B62D 5/0484 | |
| 2020/0088081 | A1 | 3/2020 | Rohde et al. | | |
| 2021/0054777 | A1 | 2/2021 | Blumreiter et al. | | |
| 2021/0179168 | A1 * | 6/2021 | Zeiler | B62D 15/0215 | |
| 2022/0003184 | A1 | 1/2022 | Blumreiter et al. | | |
| 2022/0003318 | A1 | 1/2022 | Brushkivskyy et al. | | |
| 2022/0018297 | A1 | 1/2022 | Blumreiter et al. | | |
| 2022/0034284 | A1 | 2/2022 | Klingbeil | | |
| 2022/0048563 | A1 * | 2/2022 | Schäfer | B62D 5/0481 | |
| 2023/0160350 | A1 | 5/2023 | Klingbeil | | |
| 2024/0067261 | A1 * | 2/2024 | Kim | B62D 5/046 | |
| 2024/0140525 | A1 * | 5/2024 | Maruyama | B62D 5/0457 | |
| 2024/0141844 | A1 * | 5/2024 | Lohmann | F02D 41/006 | |

FOREIGN PATENT DOCUMENTS

| | | | | | |
|---|---|---|---|---|---|
| CN | 101023250 | A | * | 8/2007 | F02D 13/0215 |
| CN | 101198771 | A | * | 6/2008 | A61K 33/38 |
| CN | 101495729 | A | * | 7/2009 | F01L 13/00 |
| CN | 100567714 | C | * | 12/2009 | F02D 13/0215 |
| CN | 101198771 | B | * | 6/2010 | A61K 33/38 |
| CN | 101900637 | A | * | 12/2010 | |
| CN | 102312731 | A | * | 1/2012 | F02D 13/0246 |
| CN | 101363378 | B | * | 7/2012 | F02B 17/005 |
| CN | 102884300 | A | * | 1/2013 | F02D 13/0219 |
| CN | 103026032 | A | * | 4/2013 | F02D 13/0207 |
| CN | 102884300 | B | * | 7/2015 | F02D 13/0219 |
| CN | 103026032 | B | * | 8/2015 | F02D 13/0207 |
| CN | 105408607 | A | | 3/2016 | |
| CN | 106004994 | A | * | 10/2016 | B62D 6/006 |
| CN | 106321269 | A | * | 1/2017 | |
| CN | 106004994 | B | * | 7/2018 | B62D 6/006 |
| CN | 108778900 | A | * | 11/2018 | |
| CN | 107499373 | B | * | 3/2020 | B62D 5/04 |
| CN | 111365133 | A | | 7/2020 | |
| CN | 112368470 | A | * | 2/2021 | F02D 13/0273 |
| CN | 108291494 | B | * | 3/2021 | F02D 13/02 |
| CN | 108474308 | B | * | 11/2021 | F02D 13/0215 |
| CN | 112368470 | B | * | 3/2023 | F02D 13/0273 |
| CN | 116811995 | A | * | 9/2023 | |
| CN | 119226660 | A | * | 12/2024 | |
| DE | 112008001007 | T5 | * | 2/2010 | F02D 41/3011 |

(56) References Cited

FOREIGN PATENT DOCUMENTS

| | | | | | |
|---|---|---|---|---|---|
| DE | 112008001087 | T5 | * | 7/2010 | ................ F02B 1/12 |
| DE | 102011105530 | A1 | * | 3/2012 | ......... F02D 13/0246 |
| DE | 102010064182 | A1 | | 6/2012 | |
| DE | 102011015696 | A1 | * | 10/2012 | |
| DE | 112011101517 | T5 | * | 5/2013 | ......... F02D 13/0219 |
| DE | 102011105530 | B4 | * | 11/2015 | ......... F02D 13/0246 |
| DE | 102016203027 | A1 | | 2/2016 | |
| DE | 112008001087 | B4 | * | 6/2016 | ................ F02B 1/12 |
| DE | 102015206837 | A1 | * | 10/2016 | ........... B62D 5/0481 |
| DE | 102015221809 | A1 | * | 4/2017 | .............. F02B 77/08 |
| DE | 112015007102 | T5 | * | 8/2018 | ............. F02D 13/02 |
| DE | 102016105498 | B4 | * | 6/2020 | ............. B62D 6/006 |
| DE | 112011101517 | B4 | * | 4/2021 | ......... F02D 13/0219 |
| DE | 102020119860 | A1 | | 2/2022 | |
| DE | 102021208165 | A1 | * | 2/2022 | |
| DE | 112015007102 | B4 | * | 7/2022 | ............. F02D 13/02 |
| DE | 102021208165 | B4 | * | 5/2024 | |
| DE | 102023128286 | A1 | * | 5/2024 | ......... F02D 13/0269 |
| EP | 2564047 | B1 | * | 3/2016 | ......... F02D 13/0207 |
| FR | 2918704 | A3 | * | 1/2009 | ......... F02D 13/0226 |
| JP | 2006161799 | A | | 6/2006 | |
| JP | 2008025534 | A | * | 2/2008 | |
| JP | 2008223537 | A | | 9/2008 | |
| JP | 2011214477 | A | * | 10/2011 | ......... F02D 13/0207 |
| JP | 5299586 | B2 | * | 9/2013 | ......... F02D 13/0219 |
| JP | 5569100 | B2 | * | 8/2014 | ......... F02D 13/0207 |
| JP | 5902289 | B2 | * | 4/2016 | ............. C10L 1/023 |
| JP | 2017078337 | A | * | 4/2017 | ............. F02D 13/02 |
| JP | 6634774 | B2 | * | 1/2020 | ............. F02D 13/02 |
| KR | 20180041195 | A | | 4/2018 | |
| KR | 102354453 | B1 | | 1/2022 | |
| WO | WO-9324749 | A1 | * | 12/1993 | ................ F01L 9/04 |
| WO | WO-2006022998 | A2 | * | 3/2006 | ......... F02D 13/0215 |
| WO | WO-2006023040 | A1 | * | 3/2006 | ......... F02D 13/0207 |
| WO | WO-2009024170 | A1 | * | 2/2009 | .......... F01L 13/0036 |
| WO | WO-2011122014 | A1 | * | 10/2011 | ......... F02D 13/0207 |
| WO | WO-2011135859 | A1 | * | 11/2011 | ......... F02D 13/0219 |
| WO | WO-2017095411 | A1 | * | 6/2017 | ............. F02D 13/02 |
| WO | WO-2017127585 | A1 | * | 7/2017 | ......... F02D 13/0215 |
| WO | WO2018221511 | A1 | | 12/2018 | |
| WO | WO-2020007456 | A1 | * | 1/2020 | ......... F02D 13/0273 |
| WO | 2020232287 | A1 | | 11/2020 | |
| WO | 2021174016 | A1 | | 9/2021 | |
| WO | 2022011275 | A1 | | 1/2022 | |

OTHER PUBLICATIONS

USPTO Final Office Action issued in U.S. Utility U.S. Appl. No. 18/177,514 dated Dec. 1, 2023.

AVL—IWIS—Dual Mode VCS TM at httpswww.youtube.comwatchv=cAlb7wJ0Uk8, dated Sep. 11, 2017. (1 page).

Clearflame—ClearFlame Engine Technologies Overview at httpswww.youtube, dated May 18, 2020. (1 page).

Clearflame—SAE Chicago Presents: ClearFlame Engine Technologies at httpswww.youtube.comwatchv=fAIMtoIU2B8, dated Mar. 2021. (1 page).

FEV—VCR Conrod Coupled Simulation at httpswww.youtube.comwatchv=30sEeZ54X_s, dated May 23, 2017. (1 Page).

FEV—Explore FEV's VCR Conrod at httpswww.youtube.comwatchv=ABNZY3Enykg, dated Apr. 24, 2015. (1 page).

Wikipedia—Glow plug (diesel engine) at https://en.wikipedia.org/wiki/Glow_plug_(diesel_engine), undated, admitted prior art. (2 pages).

Nissan—Nissan VC Turbo Engine (Variable Compression Turbo) at https://www.youtube.com/watch?v=YPDXgAWhrs4, dated Mar. 30, 2018. (4 pages).

U.S. Utility U.S. Appl. No. 17/975,399, filed Oct. 27, 2022.

U.S. Utility U.S. Appl. No. 17/659,368, filed Apr. 15, 2022.

USPTO Non-Final Office Action issued in U.S. Utility U.S. Appl. No. 18/145,536 dated Dec. 19, 2023.

USPTO Non-Final Office Action issued in U.S. Utility U.S. Appl. No. 18/462,313 dated Feb. 28, 2024.

USPTO Non-Final Office Action issued in U.S. Utility U.S. Appl. No. 18/145,524 dated Mar. 13, 2024.

U.S. Department of Energy: Energy Efficiency & Renewable Energy (EERE), Alternative Fuels Data Center, Flexible Fuel Vehicles, https://afdc.energy.gov/vehicles/flexible-fuel, Apr. 7, 2024.

John Deere: "Future Farming, John Deere presents ethanol engine at Agritechnica", https://www.futurefarming.com/tech-in-focus/john-deere-presents-ethanol-engine-at-agritechnica/, Oct. 30, 2023.

Ethanol Producer Magazine: "Vale, Komatsu and Cummins announce collaboration to develop Dual Fuel large trucks, powered by ethanol and diesel", https://ethanolproducer.com/articles/vale-komatsu-and-cummins-announce-collaboration-to-develop-dual-fuel-large-trucks-powered-by-ethanol-and-diesel/, Jul. 16, 2024 by Vale.

MAN Energy Solutions: "Methanol-ready four-stroke engines", https://www.man-es.com/marine/products/four-stroke-engines/methanol-ready-engines/, Dec. 10, 2023.

ClearFlame Engine Technologies: Diesel Engine Aftertreatment, "Our Technology, Reduce emissions and lower your cost of ownership with ClearFlame's clean engine technology", https://clearflame.com/technology/, Sep. 26, 2022.

SAE International: Heavy-Duty Diesel Sustainable Transport Symposium, Application of Westport Fuel Systems' HPDI Technology to a Demonstration Truck, Gothenburg, Sweden, (Westport Fuel Systems), https://www.sae.org/attend/heavy-duty-sustainable-transport-symposium, May 3-4, 2023.

Cummins Inc.: "Dual Fuel Engines for Drilling" (Natural Gas), https://www.cummins.com/engines/drilling/dual-fuel-engines-drilling, Sep. 18, 2018.

U.S. Department of Energy: Curan, Scott et al., Oak Ridge National Laboratory (ORNL), "Ammonia for 4-stroke Marine Dual Fuel and Gas Engines (Retrofits and New)", DOE Vehicle Technologies Office Annual Merit Review, Project Id: DORMA046, Jun. 2024.

SAE International WCX 2024, (Miles, Paul): Year-in-Review on Emissions, Fuels, and Propulsion Engines for Heavy-Duty and Off-Road Applications, Sandia National Laboratories Combustion Research Facility, Livermore, CA, SAE WCX Apr. 16-18, 2024.

Non-Final Office Action issued in U.S. Appl. No. 18/796,035 dated Jan. 29, 2025.

* cited by examiner

WORK VEHICLE COMPRESSION IGNITION POWER SYSTEM HAVING THERMALLY STRATIFIED ENGINE COMBUSTION CHAMBERS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. For many work vehicles, the power system includes a diesel engine that may have higher lugging, pull-down, and torque characteristics for associated work operations. However, diesel and other types of fossil fuel-based engines may generate undesirable emissions.

Ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are generally not suitable for in heavy work applications.

SUMMARY OF THE DISCLOSURE

The disclosure provides a work vehicle power system with a compression ignition engine having thermally stratified layers of gas within combustion chambers of the piston-cylinders sets to facilitate ignition and support operation in a range of conditions.

In one aspect, the disclosure provides a power system for a work vehicle. The power system includes an intake arrangement configured to intake charge air; and a compression ignition engine including a plurality of piston-cylinder sets configured to receive, ignite, and combust intake gas that includes the charge air from the intake arrangement to generate mechanical power and exhaust gas. Each of the piston-cylinder sets includes: a cylinder defining an intake port and an exhaust port; a piston positioned at least partially within the cylinder to form a combustion chamber in between, the combustion chamber being in fluid communication with the intake port and the exhaust port; an intake valve configured to open and close the intake port; an exhaust valve configured to open and close the exhaust port; and a fuel injector configured to inject fuel into the combustion chamber. The power system further includes a controller coupled to selectively command the intake valve and the exhaust valve such that, during an exhaust stroke of the piston, the exhaust valve is opened to enable exhaust gas to flow out of the combustion chamber; during an initial portion of an intake stroke of the piston, the intake valve is opened to enable the intake air to flow into the combustion chamber; and during a further portion of the intake stroke of the piston, the intake valve is closed and the exhaust valve is opened to enable a portion of the exhaust gas to flow back into the combustion chamber in order to create thermally stratified layers of intake gas and exhaust gas within the combustion chamber.

In another example, the controller and exhaust valve of the power system form an internal exhaust gas recirculation (EGR) arrangement.

In a further example, the compression ignition engine of the power system is configured to operate with a low cetane fuel.

In another example, the compression ignition engine of the power system is configured to operate with fuel having a cetane value of less than 40.

In a further example, the thermally stratified layers of intake gas and exhaust gas of the power system include a layer with a temperature of at least 800° C.

In another example, the power system further includes an exhaust arrangement configured to receive a first portion of the exhaust generated by the compression ignition engine; an external EGR (exhaust gas recirculation) arrangement configured to receive a second portion of the exhaust generated by the compression ignition engine as EGR gas; and a mixer configured to selectively receive and mix a first portion of the EGR gas and the charge air as mixed gas.

In a further example, the external EGR arrangement of the power system includes an EGR cooler configured to cool at least the first portion of EGR gas.

In another example, the intake arrangement of the power system includes at least one compressor configured to receive and compress the charge air upstream of the mixer.

In a further example, the exhaust arrangement of the power system includes at least one turbine driven by the first portion of the exhaust and rotationally coupled to drive the at least one compressor.

In a further example, the engine further includes an intake manifold to direct the intake gas into the piston-cylinder sets and an exhaust manifold to receive the exhaust gas from the piston-cylinder sets, and the controller is configured to manipulate a pressure difference between the exhaust manifold and the intake manifold in order to increase an impact of the portion of the exhaust gas flowing back into the combustion chamber during the further portion of the intake stroke.

In another aspect, a work vehicle is provided and includes a chassis; a drive assembly supported on the chassis; and a power system supported on the chassis and configured to power the drive assembly. The power system includes an intake arrangement configured to intake charge air; and a compression ignition engine including a plurality of piston-cylinder sets configured to receive, ignite, and combust intake gas that includes the charge air from the intake arrangement to generate mechanical power and exhaust gas. Each of the piston-cylinder sets includes: a cylinder defining an intake port and an exhaust port; a piston positioned at least partially within the cylinder to form a combustion chamber in between, the combustion chamber being in fluid communication with the intake port and the exhaust port; an intake valve configured to open and close the intake port; an exhaust valve configured to open and close the exhaust port; and a fuel injector configured to inject fuel into the combustion chamber. The power system further includes a controller coupled to selectively command the intake valve and the exhaust valve such that, during an exhaust stroke of the piston, the exhaust valve is opened to enable exhaust gas to flow out of the combustion chamber; during an initial portion of an intake stroke of the piston, the intake valve is opened to enable the intake air to flow into the combustion chamber; and during a further portion of the intake stroke of the piston, the intake valve is closed and the exhaust valve is opened to enable a portion of the exhaust gas to flow back into the combustion chamber in order to create thermally stratified layers of intake gas and exhaust gas within the combustion chamber.

In a further example, the controller and exhaust valve of the work vehicle form an internal exhaust gas recirculation (EGR) arrangement.

In another example, the compression ignition engine of the work vehicle is configured to operate with a low cetane fuel.

In a further example, the compression ignition engine of the work vehicle is configured to operate with fuel having a cetane value of less than 40.

In another example, the thermally stratified layers of intake gas and exhaust gas of the work vehicle include a layer with a temperature of at least 800° C.

In a further example, the work vehicle further includes an exhaust arrangement configured to receive a first portion of the exhaust generated by the compression ignition engine; an external EGR (exhaust gas recirculation) arrangement configured to receive a second portion of the exhaust generated by the compression ignition engine as EGR gas; and a mixer configured to selectively receive and mix a first portion of the EGR gas and the charge air as mixed gas.

In another example, the external EGR arrangement an EGR cooler configured to cool at least a first portion of EGR gas.

In a further example, the intake arrangement includes at least one compressor configured to receive and compress the charge air upstream of the mixer.

In another example, the exhaust arrangement includes at least one turbine driven by the first portion of the exhaust and rotationally coupled to drive the at least one compressor.

In a further example, the engine further includes an intake manifold to direct the intake gas into the piston-cylinder sets and an exhaust manifold to receive the exhaust gas from the piston-cylinder sets, and the controller is configured to manipulate a pressure difference between the exhaust manifold and the intake manifold in order to increase an impact of the portion of the exhaust gas flowing back into the combustion chamber during the further portion of the intake stroke The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
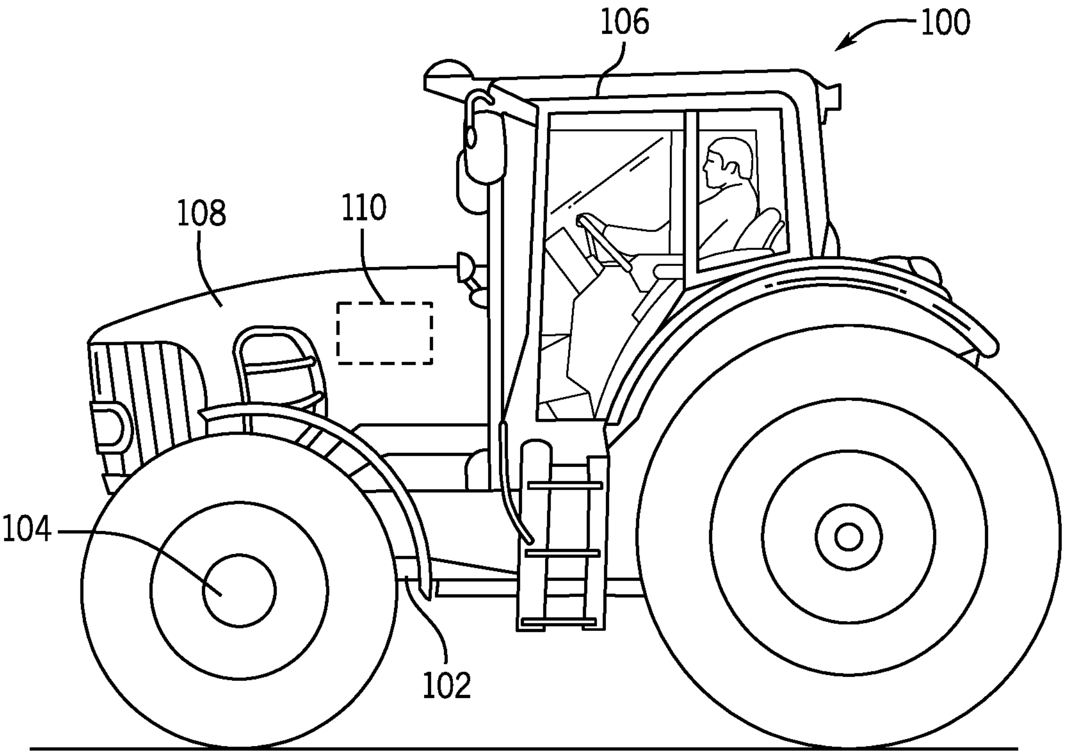
FIG. 1 is a simplified side view of an example work vehicle in the form of a tractor in which a power system may be used in accordance with an embodiment of this disclosure.

The following describes one or more example embodiments of the disclosed power system and method, as shown in the accompanying figures of the drawings described briefly above. Various modifications to the example embodiments may be contemplated by one of skill in the art. Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel and other types of fossil fuel-based engines may generate undesirable emissions. In contrast, ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are typically not suitable for in heavy work applications.

Generally, certain non-diesel fuels that have desirable sourcing, performance, and/or emission characteristics may have relatively low cetane numbers. A cetane number (or cetane value) is an indicator of the combustion speed of fuel and compression needed for ignition. The scale for measuring cetane numbers ranges from 0 to 100 with higher numbers indicating quicker ignition periods, thereby indicating lower temperatures and pressures required for combustion. In compression combustion engines (e.g., in diesel-type engines), ethanol is generally not used due to its relatively low cetane number (e.g., less than 5) that requires high temperatures for ignition. In other words, compression ignition engines that rely upon ethanol may encounter challenges in cold start and low load conditions in which the temperature is insufficient for reliable ignition. As examples, diesel fuel will reliably auto-ignite inside an engine cylinder at a temperature of about 500 to 600° C., while a fuel such as ethanol requires a temperature of about 850° C. in the cylinder to reliably auto-ignite.

According to examples discussed herein, a power system may include an engine that primarily operates on a low cetane fuel, such as ethanol and other alcohol-based fuels (e.g., methanol, propanol, etc.). Such power systems may include piston-cylinder sets operated with a type of internal exhaust gas recirculation (EGR) to provide thermal stratification within the combustion chambers in order to achieve the desired temperatures required for a compression ignition engine to auto-ignite low cetane fuels. Such an arrangement and operation enable the use of a low cetane fuel with acceptable ignition and combustion performance in a diesel-type engine. The implementation of low cetane fuels may be facilitated by other aspects of the power system, as discussed in greater detail below.

Generally, as used herein, the term "low cetane fuel" may refer to a fuel with a cetane number (or value) less than that of diesel. For example, a low cetane fuel may have a cetane number of less than 40. One such example is ethanol with a cetane number of approximately 5.

Referring to FIG. 1, in some embodiments, the disclosed power systems and methods with internal exhaust gas recirculation (EGR) to result in thermally stratified engine combustion chambers may be implemented with a work vehicle 100 embodied as a tractor that uses low cetane fuels. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. As noted, the engine of the power system 108 may be a compression ignition engine for combustion that may result in improvements in emissions, performance, efficiency, and capability. Moreover, the engine may utilize a low cetane fuel, as introduced above and discussed in greater detail below. Otherwise, the power system 108 may include an air intake arrangement to direct air into the engine and a fuel arrangement to direct fuel (or fuels) into the engine for mixing with the air for combustion, as well as optional additional systems, such as turbocharger and/or exhaust recirculation (EGR) arrangements. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of low cetane flues (e.g., ethanol). The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the control the power cycle of the engine, as discussed below. Although not shown or described in detail herein, the work vehicle 100 may include any number of additional or alternative systems, subsystems, and elements.

3 Additional information regarding the power system 108, particularly the components associated with fuel and gas flows are provided below. As introduced above and as will now be described in greater detail with reference to FIGS. 2-5, the power system 108 uses an "internal" exhaust gas recirculation (EGR) system (and, optionally, an "external" EGR) to result in thermally stratified gas within the combustion chamber of the piston-cylinder sets of the engine 120. Such functions may enhance ignition and combustion of the low cetane fuel, particularly at low temperature or low load conditions.

Figure 2A:
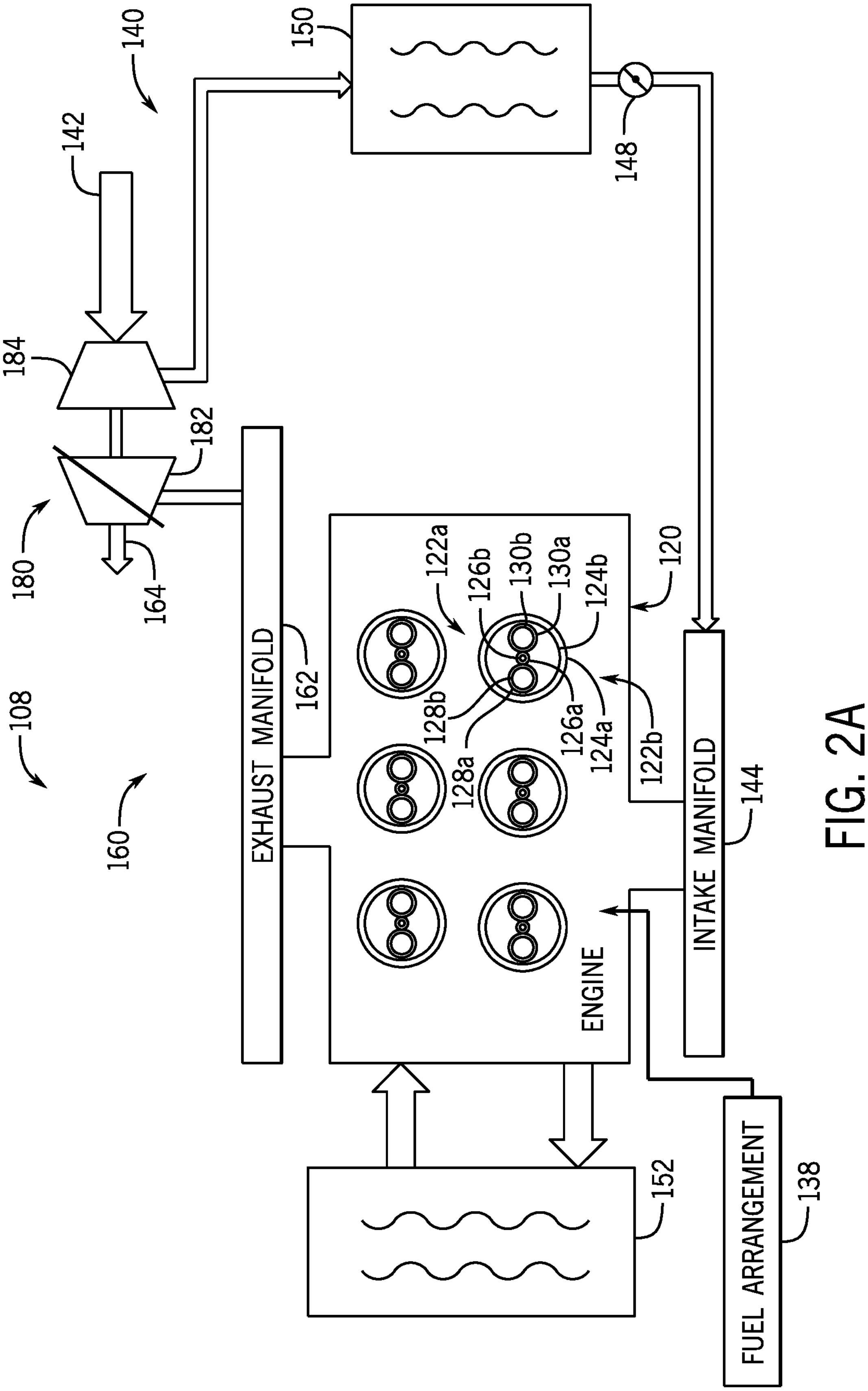
FIG. 2A is a simplified schematic diagram of the power system of FIG. 1 in accordance with an example embodiment.

Reference is initially made to FIG. 2A, which is a schematic illustration of the power system 108 for providing power to the work vehicle 100 of FIG. 1, although the characteristics described herein may be applicable to a variety of machines. The configuration of FIG. 2A is just one example of the power system 108 and example embodiments according to the disclosure herein may be provided in other configurations.

As introduced above, the power system 108 includes an engine 120 configured to combust a mixture of fuel from a fuel arrangement 138 and air from an air intake arrangement 140 to generate power for propulsion and various other systems, thereby generating an exhaust gas that is accommodated by an exhaust arrangement 160. As also introduced above, various aspects of the power system 108 may be operated by the controller 110 (FIG. 1) based on operator commands and/or operating conditions. In some examples, the controller 110 may be a dedicated power system controller or a vehicle controller.

As noted, the engine 120 is primarily an engine that utilizes low cetane fuels, such as ethanol. Such an engine 120 may be similar to a diesel engine (i.e., compression ignition and combustion) in configuration and arrangement, except that other fuels are combusted instead of diesel. The engine 120 may have any number or configuration of piston-cylinder sets 122*a* within an engine block 122*b*. In the illustrated implementation, the engine 120 is an inline-6 (1-6) engine defining six piston-cylinder sets 122*a*. Additional details about the piston-cylinder sets 122*a* are provided below. In addition to those discussed below, the engine 120 may include any suitable features, such as cooling systems, peripheries, drivetrain components, sensors, etc.

As noted above, the engine 120 is selectively provided fuel for combustion by the fuel arrangement 138, particularly a low cetane fuel, such as ethanol. Generally, the fuel arrangement 138 may include any suitable components to facilitate operation (e.g., pumping, flow control, storage, injection, and the like) of the engine 120 and overall power system 108.

As also noted above, the engine 120 is selectively provided air for combustion by the air intake arrangement 140. The air intake arrangement 140, in this example, includes an intake conduit 142 and an air intake manifold 144. The air intake arrangement 140 directs fresh or ambient air through the air intake conduit 142; and the air intake manifold 144 directs at least a portion of that air into the air intake manifold 144 for introduction into the piston-cylinder sets 122*a* of the engine block 122*b* to be ignited with the fuel (e.g., ethanol) such that the resulting combustion products drive the mechanical output of the engine 120. Additional details about the air intake arrangement 140 will be provided below.

In one example and as schematically represented in FIG. 2, each of the piston-cylinder sets 122*a* includes a piston 124*b* arranged within the cylinder 124*a* to create a combustion chamber in between such that movement of the piston 124*b* within the cylinder 124*a* functions to facilitate the flow of gas into and out of the combustion chamber; to compress the gas within the combustion chamber to enable ignition and combustion; and to be driven by the combustion products to transfer the resulting mechanical power from the combustion process to a prime mover of the engine 120. Additionally, a fuel injector 126*b* is arranged to introduce an amount of fuel into the combustion chamber via a fuel port 126*a*. Moreover, an intake valve 130*b* is arranged to open and close an intake port 130*a* to admit intake gas from an intake conduit into the combustion chamber; and an exhaust valve 128*b* is arranged to open and close an exhaust port 128*a* to enable gas to flow out of the combustion chamber into an exhaust conduit. Additionally, under some circumstances discussed in greater detail below, the exhaust valve 128*b* may be manipulated in order to open the exhaust port 128*a* to draw exhaust air from the exhaust manifold 162 back into the combustion chamber.

The exhaust gas produced from the combustion process of the engine 120 may be received by the exhaust arrangement 160, which includes an exhaust manifold 162 to receive and distribute the exhaust from the piston-cylinder sets 122*a*. At least a portion of the exhaust gas is directed from the exhaust manifold 162 into an exhaust conduit 164 out of the work vehicle 100, as described in greater detail below. Although not shown in detail, the exhaust gas may flow through one or more exhaust treatment components arranged proximate to the exhaust conduit 164. Such exhaust treatment components may function to treat the exhaust gas passing therethrough to reduce undesirable emissions and may include components such as a diesel oxidation catalyst (DOC), a diesel particulate filter (DPF), a selective catalytic reduction (SCR) system, and the like.

In this example, the power system 108 may include one or more turbochargers 180, one of which is shown with portions that may also be considered part of (or otherwise cooperate with) the air intake arrangement 140 and/or the exhaust arrangement 160.

The turbocharger 180 generally functions to increase the amount of air subsequently directed into the engine 120 for improved engine efficiency and power input. In one example, the turbocharger 180 includes a turbine 182 that receives a portion (e.g., the second portion) of the exhaust gas, as introduced above. The turbocharger 180 further includes a compressor 184 that is driven by the turbine 182. The compressor 184 functions to compress the ambient or charge air that enters the air intake arrangement 140 via the intake conduit 142. Generally, the turbocharger 180 may be a variable-geometry turbocharger, a wastegate (WG) turbocharger, a fixed turbocharger, and/or any other suitable type of turbocharger.

Returning to the air intake arrangement 140, the compressed charge air from the turbocharger compressor 184 may be directed into a charge air cooler 150 to reduce the temperature of the compressed charge air. In this example, the charge air cooler 150 is configured to direct the charge air into proximity with cooling air (or other type of coolant) such that the heat is transferred from the charge air to the cooling air. Other cooling or heat exchange mechanisms may be provided. Briefly, the power system 108 may additionally include a second heat exchanger (or radiator) 152 to facilitate cooling of the engine 120 via circulation of the coolant over a cooling mechanism, such as air-cooled fins. The coolant of the radiator 152 may be on the same cooling circuit as the coolant of the charge air cooler 150, or the charge air cooler 150 and the radiator 152 may be on separate cooling circuits.

Downstream of the charge air cooler 150, the cooled intake charge air is directed to the intake manifold 144, which as noted above, distributes the intake gas to the piston-cylinder sets 122*a* of the engine 120 for mixture, ignition, and combustion with fuel from the fuel arrangement 138.

Additionally, the piston-cylinder sets 122*a* may be manipulated based on commands from the controller 110 (FIG. 1) in order to provide a type of "internal" EGR arrangement. As discussed in greater detail below, the exhaust valves 128*b* may be opened to admit previously exhausted gas back into the piston-cylinder sets 122*a* in order to create the thermal stratification of gas within the piston-cylinder sets 122*a* that function to enable enhanced ignition, even for low cetane fuels during both high and low load operating conditions.

As introduced above, the controller 110 (FIG. 1) may control operation of the engine 120, including the fuel arrangement 138 and air intake arrangement 140, as well as various other cooperating systems and components. In particular, the controller 110 may selectively command the nature of the air being directed into the air intake manifold 144 to provide reliable ignition and combustion within the engine 120 under all appropriate conditions. Generally, the controller 110 (FIG. 1) may be in communication with the various valves 128*b*, 130*b*, 148, injectors 126*b*, engine 120, sensors, and other associated components to collect information about operation of the power system 108 and to implemented or command modification and/or maintenance of such operation. As an example, prior to and during operation, the manifold pressures to provide advantageous internal EGR conditions may be manipulated in order to enhance and/or facilitate the internal EGR in providing the elevated temperatures suitable for auto-ignition of the low cetane fuel. For example, the controller (e.g., controller 110 of FIG. 1) may command the intake throttle 148; vane settings of turbocharger compressor 184; and/or turbocharger turbine throttle (e.g., turbine 182).

The power system 108 depicted in FIG. 2A is merely one example of a power system that may utilize a mechanism such as internal EGR in order to create thermally stratified layers of gas within piston-cylinder set combustion chambers to facilitate ignition and/or combustion. A further example power system is discussed below in reference to FIG. 2B prior to a more detailed discussion of the thermally stratified layers of gas within the combustion chambers discussed with reference to FIGS. 3A-3D, 4, and 5. Other configurations of power systems may be provided.

Figure 2B:
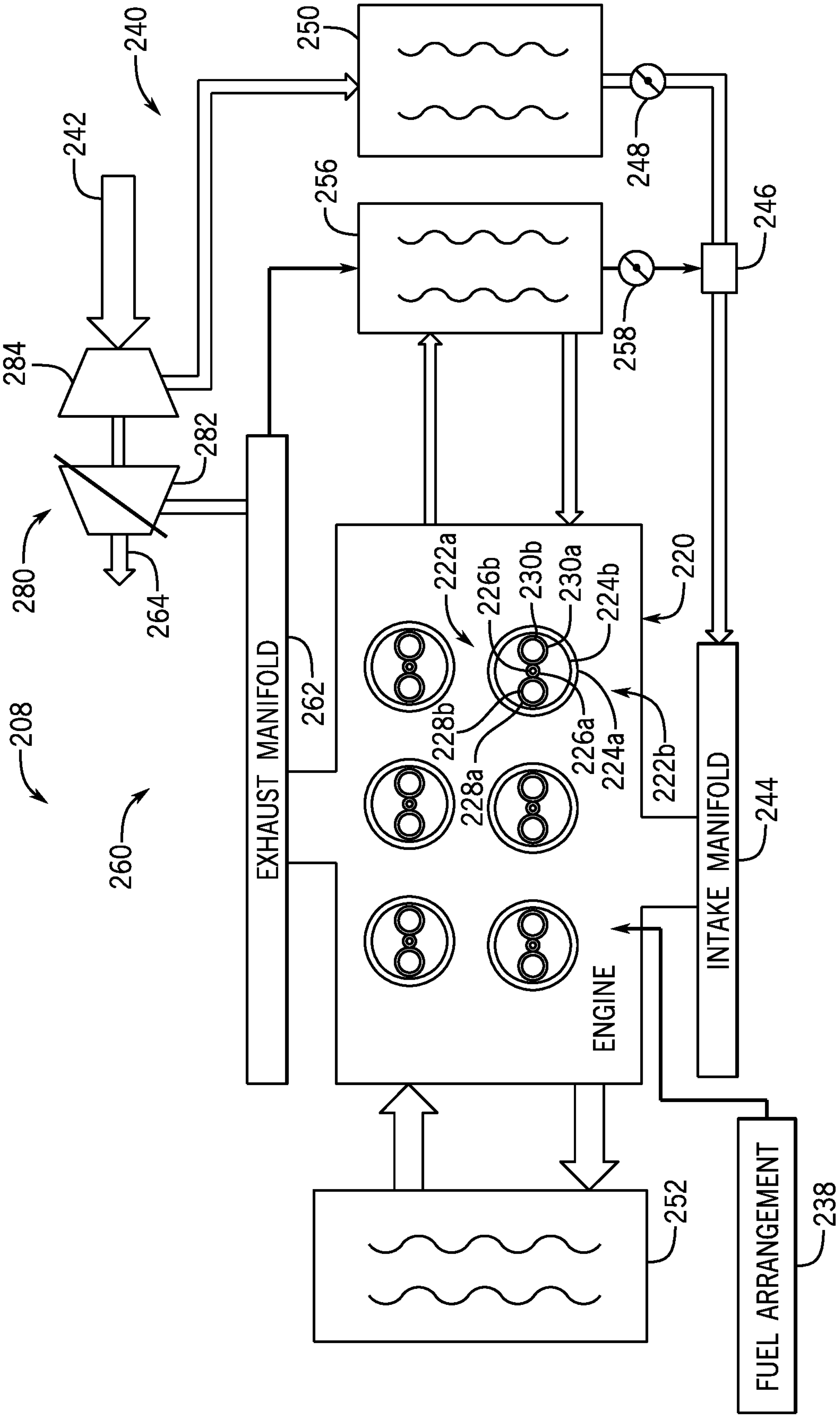
FIG. 2B is a simplified schematic diagram of a power system that may be implemented in the work vehicle of FIG. 1 in accordance with a further example embodiment.

Reference is additionally made to FIG. 2B, which is a schematic illustration of a further power system 208 that may be incorporated into the work vehicle 100 of FIG. 1 and/or other types of machines. As above, the power system 208 includes an engine 220 configured to combust a mixture of fuel from a fuel arrangement 238 and air from an air intake arrangement 240 to generate power for propulsion and various other systems, thereby generating an exhaust gas that is accommodated by an exhaust arrangement 260. As also introduced above, various aspects of the power system 208 may be operated by the controller (e.g., controller 110 of FIG. 1) based on operator commands and/or operating conditions.

As noted, the engine 220 is primarily an engine that utilizes low cetane fuels, such as ethanol, provided by the fuel arrangement 238. Such an engine 220 may be similar to a diesel engine (i.e., compression ignition and combustion) in configuration and arrangement, except that other fuels are combusted instead of diesel. The engine 220 may have any number or configuration of piston-cylinder sets 222*a* within an engine block 222*b*.

The air intake arrangement 240, as above, includes an intake conduit 242 and an air intake manifold 244. The air intake arrangement 240 directs fresh or ambient air through the air intake conduit 242; and the air intake manifold 244 directs at least a portion of that air into the air intake manifold 244 for introduction into the piston-cylinder sets 222*a* of the engine block 222*b* to be ignited with the fuel (e.g., ethanol) such that the resulting combustion products drive the mechanical output of the engine 220. Additional details about the air intake arrangement 240 will be provided below.

Generally, each of the piston-cylinder sets 222*a* includes a piston 224*b* arranged within the cylinder 224*a* to create a combustion chamber in between such that movement of the piston 224*b* within the cylinder 224*a* functions to facilitate the flow of gas into and out of the combustion chamber; to compress the gas within the combustion chamber to enable ignition and combustion; and to be driven by the combustion products to transfer the resulting mechanical power from the combustion process to a prime mover of the engine 220. Additionally, a fuel injector 226*b* is arranged to introduce an amount of fuel into the combustion chamber via a fuel port 226*a*. Moreover, an intake valve 230*b* is arranged to open and close an intake port 230*a* to admit intake gas from an intake conduit into the combustion chamber; and an exhaust valve 228*b* is arranged to open and close an exhaust port 228*a* to enable gas to flow out of the combustion chamber into an exhaust conduit. Additionally, under some circumstances discussed in greater detail below, the exhaust valve 228*b* may be manipulated in order to open the exhaust port 228*a* to draw exhaust air from the exhaust manifold 262 back into the combustion chamber.

The exhaust gas produced from the combustion process of the engine 220 may be received by the exhaust arrangement 260, which includes an exhaust manifold 262 to receive and distribute the exhaust. At least a portion of the exhaust gas is directed from the exhaust manifold 262 into an exhaust conduit 264 out of the work vehicle.

In this example, the power system 208 may include one or more types of exhaust gas recirculation (EGR) systems, including an "external" EGR arrangement 270 and an "internal" EGR arrangement, and a turbocharger 280, each of which may have at least portions that may also be considered part of (or otherwise cooperate with) the air intake arrangement 240 and/or the exhaust arrangement 260.

Generally, the external EGR arrangement 270 is configured to direct at least a first portion of exhaust gas out of the engine 220 and then back to the air intake arrangement 240 of the engine 220 as EGR gas, i.e., such that a remaining, second portion of the exhaust gas is directed through the turbocharger 280 and out of the vehicle via the exhaust conduit 264 as vehicle exhaust, as noted above. Generally, the EGR gas may be mixed with charge air (e.g., recirculated back to intake) in order to reduce the formation of NOx during combustion that may otherwise occur. Any suitable amount of exhaust gas may be recirculated (e.g., 10%-20%).

The EGR arrangement 270 may include one or more EGR valves 258 that operate to control the various flows of EGR gas and/or exhaust gas. In this example, the EGR arrangement 170 may have an EGR cooler 256. The EGR cooler 256 may be any suitable device configured to lower the temperature of the recirculated gas. Generally, the EGR cooler 256 includes one or more recirculated gas passages and one or more coolant passages, arranged such that heat may be transferred from the recirculated gas to a cooperating fluid (e.g., air or liquid). In some contexts, the EGR arrangement 270 may be considered an "external" EGR arrangement 270, in contrast to an "internal" EGR arrangement in which exhaust gas is pulled directly from the exhaust manifold 262 back into the piston-cylinder sets 222*a*, as discussed in greater detail below. As additionally reflected by the example in FIG. 2B, the internal EGR arrangement may eliminate the need for a "hot EGR loop," e.g., in which at least a portion of the external EGR gas bypasses EGR cooler 256.

As above, the turbocharger 280 generally functions to increase the amount of air subsequently directed into the engine 220 for improved engine efficiency and power input. In one example, the turbocharger 280 includes a turbine 282 that receives a portion (e.g., the second portion) of the exhaust gas and a compressor 284 that is driven by the turbine 282. The compressor 284 functions to compress the ambient or charge air that enters the air intake arrangement 240 via the intake conduit 142.

Returning to the air intake arrangement 240, the compressed charge air from the turbocharger compressor 284 may be directed into a charge air cooler 250 to reduce the temperature of the compressed charge air. Briefly, the power system 208 may additionally include a second heat exchanger (or radiator) 252 to facilitate cooling of the engine 220 via circulation of the coolant over a cooling mechanism, such as air-cooled fins.

Downstream of the charge air cooler 250 and the EGR cooler 256, the cooled EGR gas and the intake charge air are mixed within a mixer 246 The relatively hot temperature of the first portion of EGR gas operates to increase the temperature of the charge air in the mixer 246. As shown, the amount of compressed charge air directed into through the charge air cooler 250 and to the mixer 246 may be controlled by an air throttle valve 248; and the amount of cooled EGR gas directed to the mixer 246 may be controlled by EGR valve 258. The second mixed gas (or intake gas) is directed to the intake manifold 244, which as noted above, distributes the intake gas to the piston-cylinder sets 222*a* of the engine 220 for mixture, ignition, and combustion with fuel from the fuel arrangement 138.

Additionally, the piston-cylinder sets 222*a* may be manipulated based on commands from the controller (e.g., controller 110 of FIG. 1) in order to provide a type of "internal" EGR arrangement that, in effect, avoids the exhaust gas circuit of the EGR arrangement 270 (e.g., the "external" EGR arrangement) discussed above. As discussed in greater detail below, the exhaust valves 228*b* may be opened to admit previously exhausted gas back into the piston-cylinder sets 222*a* in order to create the thermal stratification of gas within the piston-cylinder sets 222*a* that function to enable enhanced ignition, even for low cetane fuels during both high and low load operating conditions.

The power system 208 depicted in FIG. 2B is a further example of a power system that may utilize a mechanism such as internal EGR in order to create thermally stratified layers of gas within piston-cylinder set combustion chambers to facilitate ignition and/or combustion, as discussed in greater detail below with reference to FIGS. 3A-3D and 4.

As examples, FIGS. 3A-3D are simplified schematic diagrams of a portion of a power cycle within the example piston-cylinder set 122*a* of the power system 108 of FIG. 2A in accordance with an example embodiment, although the examples described below may also be applicable to the piston-cylinder sets 222*a* of FIG. 2B.

As introduced above, each of the piston-cylinder sets 122*a* includes a piston 124*b* arranged within the cylinder 124*a* to create a combustion chamber 134 in between such that movement of the piston 124*b* within the cylinder 124*a* functions to facilitate the flow of gas into and out of the combustion chamber 134; to compress the gas within the combustion chamber 134 to enable ignition and combustion; and to be driven by the combustion products to transfer the resulting mechanical power from the combustion process to a prime mover of the engine 120. Additionally, the fuel injector 126*b* is arranged to introduce an amount of fuel into the combustion chamber 134 via the fuel port 126*a*. Moreover, the intake valve 130*b* is arranged to open and close the intake port 130*a* to admit intake gas from an intake conduit 132*b* into the combustion chamber 134; and the exhaust valve 128*b* is arranged to open and close the exhaust port 128*a* to enable gas to flow out of the combustion chamber 134 into an exhaust conduit 132*a*. Additionally, under some circumstances discussed in greater detail below, the exhaust valve 128*b* may be manipulated to open in order to draw exhaust air from the exhaust conduit 132*a* back into the combustion chamber 134 as a type of internal EGR arrangement. Generally, the exhaust conduit 132*a* may be considered part of the exhaust manifold 162 (FIG. 2A).

As introduced above, collectively and individually, the piston-cylinder sets 122*a* undergo a four-stroke power cycle in one example embodiment. Generally, the power cycle includes an intake stroke, a compression stroke, a power stroke, and an exhaust stroke, which are constantly repeated during operation of the engine 120. During the intake stroke, the piston 124*b* moves from the top dead center (TDC) to the bottom dead center (BDC); and during this movement, at least the intake valve 130*b* is open while the piston 124*b* pulls air into the combustion chamber 134 by producing vacuum pressure into the cylinder 124*a* through the downward motion. Additional details regarding the intake stroke are discussed below. During the compression stroke, the piston 124*b* moves from the bottom dead center (BDC) to the top dead center (TDC); and during this movement, both the intake and exhaust valves 130*b*, 128*b* are closed in this stroke, thereby resulting in adiabatic air compression to increase the pressure and temperature. At the end of this stroke, fuel is injected by the fuel injector 126*b* to be ignited and burned in the compressed hot gas. During the power stroke, the piston 124*b* is driven by the combustion of the fuel and gas mixture from the top dead center (TDC) to the bottom dead center (BDC); and during this movement, both the intake and exhaust valves 130*b*, 128*b* are closed. During the exhaust stroke, the piston 124*b* moves from the bottom dead center (BDC) to the top dead center (TDC); and during this movement, the exhaust valve 128*b* is open while the piston 124*b* forces exhaust gases out of the combustion chamber 134. At the end of this stroke, the crankshaft coupled to the piston 124*b* has completed a second full 360° revolution.

The views of FIGS. 3A-3D depict characteristics of the piston-cylinder sets 122*a* during various portions of the power cycle. In addition to the valve and piston positions, the views of FIGS. 3A-3D include representations (e.g., reflected by stippling, cross-hatching, or shading) of the relative temperature striations or layers of gas 136*a*, 136*b*, 136*c*, 136*d*, within the combustion chamber 134. In the discussion below, generally, the first temperature gas 136*a* is cooler than the second temperature gas 136*b*, which is cooler than the third temperature gas 136*c*, and so on. In other words, the fourth temperature gas 136*d* is hotter than the third temperature gas 136*c*, which is hotter than the second temperature gas 136*b*, and so on.

Figure 3B:
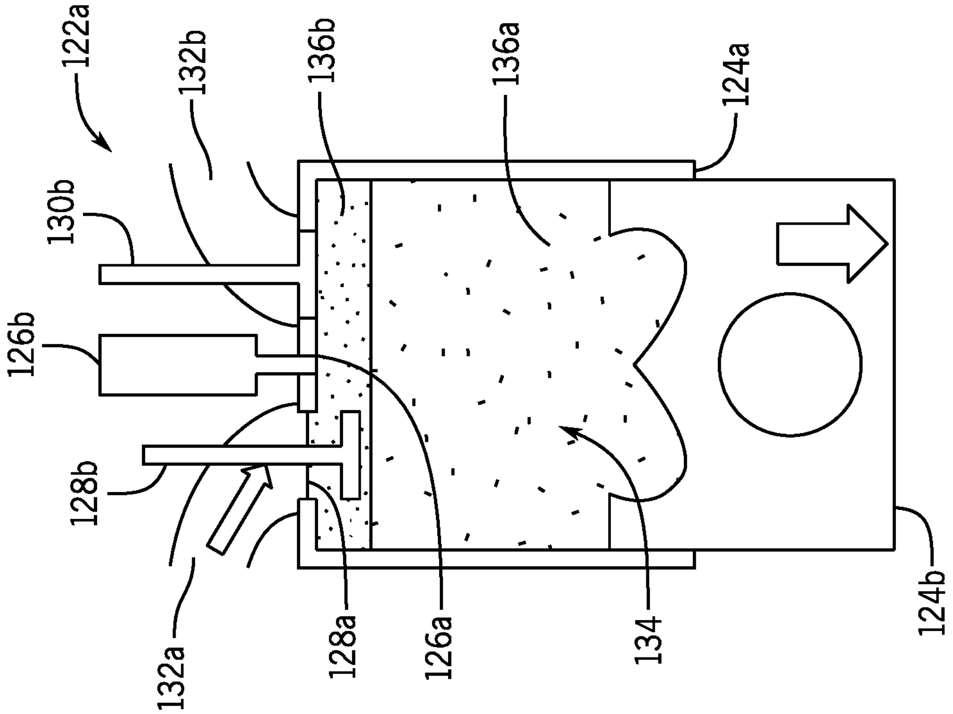
FIGS. 3A-3D are simplified schematic diagrams of a portion of a power cycle within an example piston-cylinder set of the power system of FIG. 2A in accordance with an example embodiment.
Figure 3A:
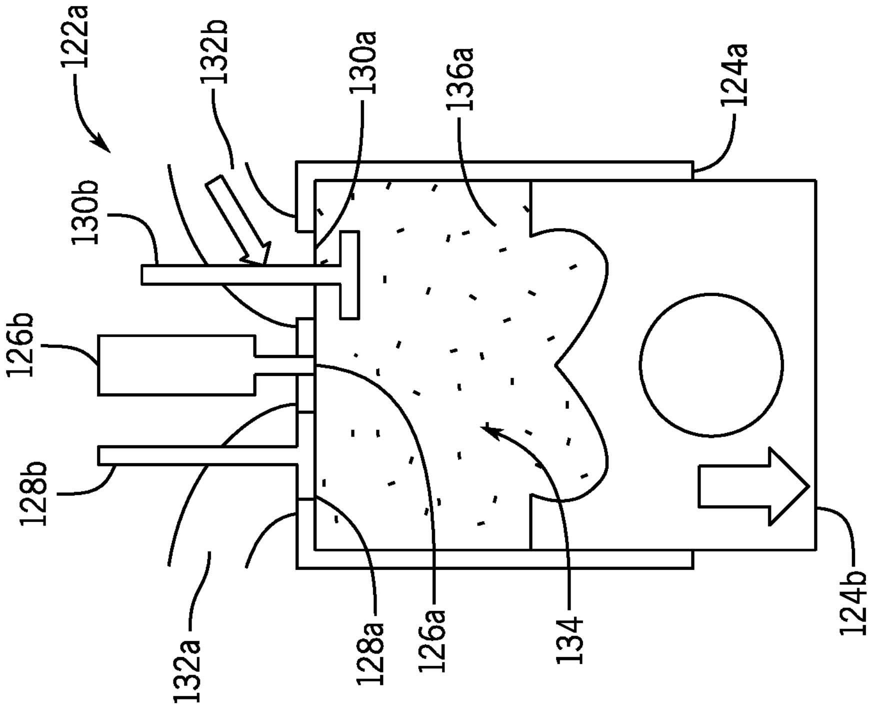

As an example, the view of FIG. 3A depicts an initial portion of the intake stroke in which the piston 124*b* is lowered. As shown, the intake valve 130*b* is commanded to open to admit intake air through the intake conduit 132*b* and the intake port 130*a* into the combustion chamber 134. At this point, gas within the combustion chamber 134 is generally first temperature gas 136*a*, reflecting the relatively low temperatures of the intake gas flowing in through the intake port 130*a*.

As a further example, the view of FIG. 3B depicts an end portion of the intake stroke in which the piston 124*b* is approaching bottom dead center (BDC). As shown, the intake valve 130*b* may be closed and the exhaust valve 128*b* may be opened such that a relatively small amount of exhaust gas may be admitted into the combustion chamber 134. Due to the configuration of the exhaust port 128*a* and other characteristics of the piston-cylinder set 122*a*, the exhaust gas may form a layer the longitudinal top end of the combustion chamber 134 proximate to the exhaust port 128*a* as second temperature gas 136*b*, which is stratified relative to the lower, first temperature gas 136*a*.

Figure 3D:
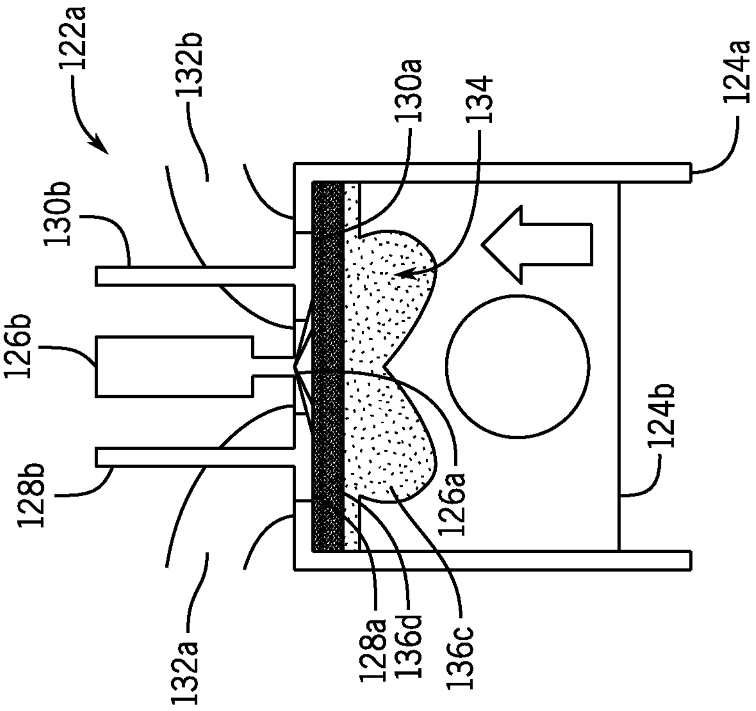
Figure 3C:
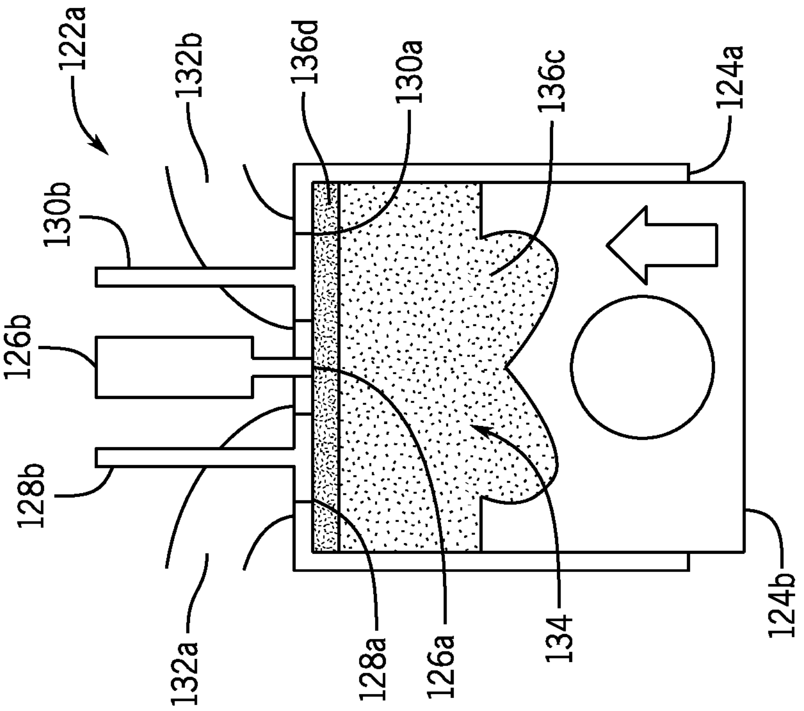

As a further example, the view of FIG. 3C depicts a portion of the compression stroke in which the piston 124*b* is compressing the gas within the combustion chamber 134. As the gas is compressed, the first temperature gas 136*a* from FIG. 3B is increased in temperature to result in a third temperature gas 136*c*, and the second temperature gas 136*b* from FIG. 3B is increased in temperature to result in a fourth temperature gas 136*d*. Although the exact temperature relationships between FIGS. 3B and 3C may vary based on the characteristics and circumstances, the gas within the combustion chamber 134 remains thermally stratified with the higher temperature gas (e.g., fourth temperature gas 136*d*) being proximate to the ports 126*a*, 128*a*, 130*a* and the lower temperature gas (e.g., the third temperature gas 136*c*) being proximate to the surface of the piston 124*b*.

As a further example, the view of FIG. 3D depicts an end portion of the compression stroke in which the piston 124*b* is approaching top dead center (TDC) and fuel is being injected into the combustion chamber 134. As the gas is further compressed, the third and fourth temperature gases 136*c*, 136*d* from FIG. 3C may be further increased in temperature in FIG. 3D. Although the exact temperature relationships between FIGS. 3C and 3D may vary based on the characteristics and circumstances, the gas within the combustion chamber 134 remains thermally stratified with the higher temperature gas (e.g., fourth temperature gas 136*d*) being proximate to the ports 126*a*, 128*a*, 130*a* and the relatively lower temperature gas (e.g., the third temperature gas 136*c*) being proximate to the surface of the piston 124*b*.

In effect, reflected by the progression of the views from FIG. 3A to FIG. 3D, the gas within the combustion chamber 134 is thermally stratified and the relatively hotter exhaust gas pulled into the combustion chamber 134 via the exhaust port 128*a* remains relatively unmixed with the lower temperature intake gas pulled into the combustion chamber 134 via the intake port 130*a*. Further, as the gas within the combustion chamber 134 is compressed, the layer of relatively hotter gas is further increased in temperature. The elevated temperature may occur not only from the elevated temperature of the exhaust gas, but also from the additional volume of gas within the combustion chamber 134 pulled in through the exhaust port 128*a* (e.g., as compared to only admitting gas from the intake port 130*a*). At the point just prior to ignition (e.g., as generally reflected in FIG. 3D), the layer of hotter gas (e.g., fourth temperature gas 136*d*) is at a temperature sufficient to enable auto-ignition, even if the remaining gas (e.g., third temperature gas 136*c*) within the combustion chamber 134 is not at a temperature suitable for auto-ignition. However, as the layer of hotter gas (e.g., fourth temperature gas 136*d*) ignites and initiates combustion, the remaining gas (e.g., third temperature gas 136*c*) is also ignited and combusted. Generally, the fourth temperature gas 136*d*, at the point of top dead center (TDC) of the power cycle, is at a temperature suitable for ignition of a low cetane fuel such as ethanol. A suitable temperature may be, for example, at least 800° C.

In the view of FIG. 3D, when the piston 124*b* is near top dead center (TDC), the compression provided by the piston 124*b* provides a "squish effect" in which the fourth temperature gas 136*d* is pushed in towards the center of the chamber 134 towards the tip of the fuel injector 126*b*, thereby providing the hottest gas near the injection of the first portion of the fuel to aid in auto ignition.

Additionally, the progression of views from FIG. 3A to FIG. 3D reflects the compression heating resulting from the exhaust gas being pulled back into the combustion chamber 134, particularly when the exhaust manifold has a higher pressure than the intake manifold and upon the valve events discussed in greater detail below with reference to FIG. 4. In particular, after the intake valve 130*b* closes (e.g., as reflected in between the conditions depicted in FIG. 3A and FIG. 3B), the gas within the combustion chamber 134 will be at intake manifold pressure. Subsequently, the re-opening of the exhaust valve 128*b* (as reflected in FIG. 3B) allows the hotter exhaust gas into the combustion chamber 134, and as the piston 124*b* reaches the bottom of the stroke and the exhaust valve 128*b* is near closing, the chamber pressure will be increased to approximately the exhaust manifold pressure. The gas that was already ingested into the combustion chamber 134 (e.g., gas 136*a* of FIG. 3B) will rapidly increase in pressure in an adiabatic process, thereby also increasing the temperature. As discussed below with reference to FIG. 5, the amount of temperature increase may depend on the absolute pressures of the exhaust and intake manifolds and differences in pressure between the exhaust and intake manifolds. As noted, additional details regarding this function are discussed below with reference to FIG. 5.

Generally, the stratification of the gas within the combustion chamber 134 may be facilitated and/or maintained by the configuration of the ports 128*a*, 130*a* and/or piston 124*b*. In particular, the ports 128*a*, 130*a* and/or piston 124*b* may be configured (e.g., shapes and angles) so as to reduce or prevent swirl (e.g., rotation around a longitudinal axis) within the combustion chamber 134; and more importantly, such components may be configured to reduce or prevent tumble (e.g., movement along a longitudinal axis, between top and bottom) within the combustion chamber 134. These configurations and resulting impact on gas flow within the combustion chamber 134 functions to inhibit and/or prevent mixing between stratification layers, e.g., such that the high temperature layer of gas at the top of the combustion chamber 134 is maintained. This may be in contrast to other internal-type EGR arrangement in which mixing is encouraged to evenly distribute fuel within the combustion chamber.

Figure 4:
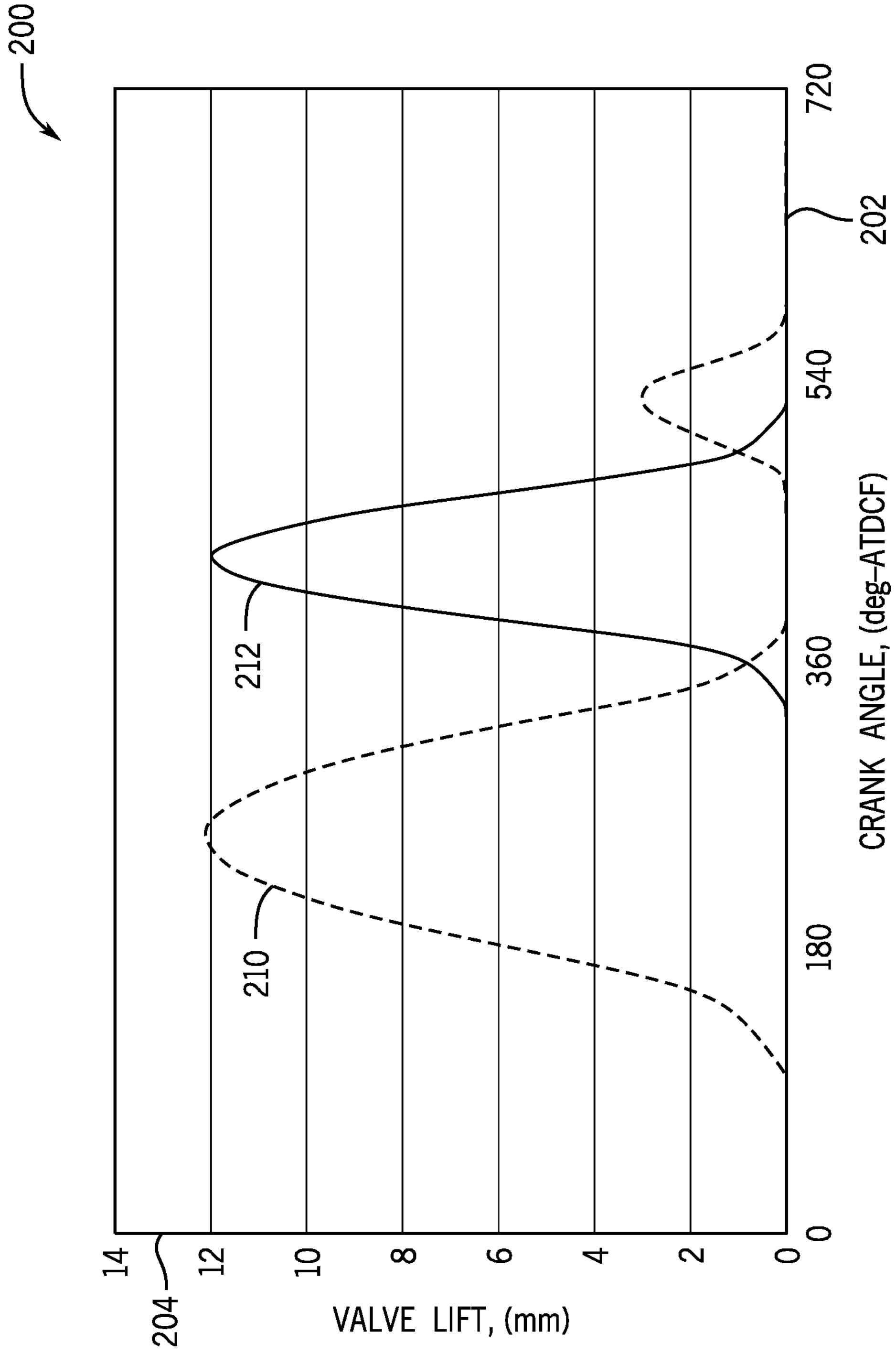
FIG. 4 is a chart depicting valve positions as a function of crank angle within a power cycle of the power system of FIG. 2A in accordance with an example embodiment.

Additional details about the power cycle are represented by the chart 200 of FIG. 4, which depicts crank angle (e.g., 0° to 720°) on the horizontal axis 202 and valve position (e.g., 0 mm to 14 mm) on the vertical axis 204. In particular, line 210 represents the positions of the exhaust valve over the crank angles, and line 212 represents the positions of the intake valve over the crank angles. Generally, reflecting the discussion above and referring to line 212, the intake valve is opened during the intake stroke (e.g., to a maximum of 12 mm at approximately 450°). Additionally, and referring now to line 210, at the end of the intake stroke (e.g., between 450° and 540°), the exhaust valve is opened (e.g., to approximately 3 mm) to admit the exhaust gas, as discussed above. Further referring to line 210, the exhaust valve is fully opened during the exhaust stroke (e.g., between approximately 180° to 360°). This timing of the power cycle enables the thermal stratification of the gas within the combustion chamber as discussed above.

Figure 5:
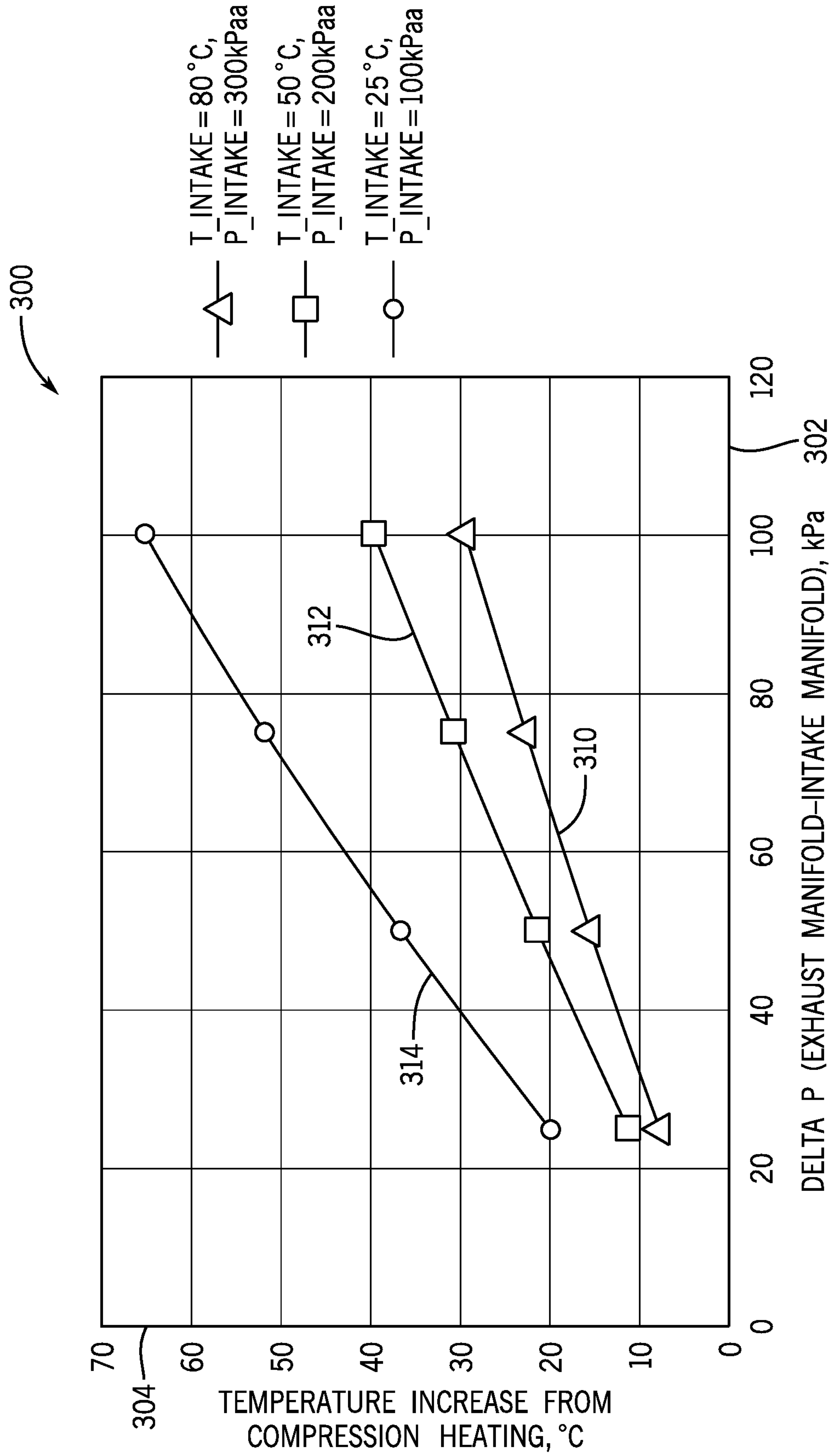
FIG. 5 is a chart depicting the impact of engine and/or operating conditions on a compression heating function for the power system of FIG. 2A in accordance with an example embodiment.

Additional details about the temperature increases and stratification resulting from the "internal" EGR are reflected by the chart 300 of FIG. 5 that, in general, reflects the effect of compression heating facilitated by the increased chamber pressure resulting from the intake of exhaust gas. In particular, the chart 300 depicts temperature increases (e.g., in C°, reflected on a vertical axis 304) as a function of intake and exhaust pressure differences (e.g., pressure deltas in kPa between the intake and exhaust manifolds, reflected on a horizontal axis 302) under various conditions. In effect, the lines 310, 312, 314 within the chart 300 reflect the impact of compression heating for various conditions and pressure differences that may result from the internal EGR arrangement discussed above. Line 310 reflects the impact of compression heating at relatively high loads (e.g., example intake temperature of 80° and intake pressure of 300 kPaa); line 312 reflects the impact of compression heating at relatively moderate loads (e.g., example intake temperature of 50° C. and intake pressure of 200 kPaa); and line 314 reflects the impact of compression heating at relatively low or idle loads (e.g., example intake temperature of 25° C. and intake pressure of 100 kPaa). As shown, amount of temperature increase depends on the differences in the pressures of the exhaust manifold and intake manifold and the absolute pressures. For example, at idle when absolute pressures are low (e.g., as shown in line 314), a relatively large pressure difference of 100 kPa may result in 65° C. of temperature increase. However, at high engine loads with absolute pressures are high (e.g., as shown in line 310), the pressure difference may be less effective such that a pressure difference of 100 kPa may only result in 30° C. of temperature increase.

Prior to and during operation, the manifold pressures may be manipulated in order to enhance and/or facilitate the internal EGR in providing the elevated temperatures suitable for auto-ignition of the low cetane fuel. For example, the controller (e.g., controller 110 of FIG. 1) may command the intake throttle (e.g., intake throttle 148, 248 of FIGS. 2A and 2B); the EGR valve (e.g., EGR valve 258 of FIG. 2B), if present; vane settings of turbocharger compressor (e.g., compressor 184, 284 of FIGS. 2A and 2B); and/or turbocharger turbine throttle (e.g., turbine 182, 282 of FIGS. 2A and 2B).

Accordingly, the power systems discussed above provide the ability to use ethanol and other low cetane fuels in a diesel-type, compression ignition engine over a range of conditions, including cold starts and low load conditions. Overall, the power systems described herein result in a platform architecture that may provide improved fuel consumption, higher performance, and reduced criteria pollutants over a relatively wide temperature operating window. The use of ethanol as fuel in a diesel-like combustion mode provides benefits from high brake thermal efficiency and low exhaust temperatures. Moreover, combustion of ethanol produces relatively little soot and/or coking. Moreover, at relatively light loads, this may enable the use of less EGR gas than may otherwise be needed for this purpose, thereby enabling more efficient use of EGR gas through the engine and the resulting lower NOx emissions and advantageous ignition and combustion characteristics. This may also enable increased exhaust flow for the turbochargers.

Further, examples use an infusion of hot exhaust gas from the exhaust port at the end of the intake stroke to create a local volume of hot gas in the combustion chamber at the start of the compression stroke. In some examples, little or no tumble movement within the combustion chamber during the compression stroke to reduce the amount of mixing of the hot exhaust gas with the cooler gases from the intake manifold, which operates to create what thermally stratified layers of gas in the combustion chamber near the end of the compression stroke. At least a portion of this gas will now be well above the auto auto-ignition temperature of the low cetane fuel, while the coolest compressed gas from the intake manifold will be below the ignition temperature. When fuel is injected, some fuel is injected into the hot gas area and ignites which will lead to the combustion of the remaining fuel injected. Examples described herein enables an engine system to retain diesel-like air systems with existing manifold temperatures. Moreover, such examples may provide reduced thermal loading in the cylinder as compared to the external hot EGR arrangement running hotter intake manifold temperatures, which enables less or no additional piston thermal barrier coatings. Further, only a fraction of hot EGR may be needed, which reduces the amount of boost pressure required to achieve the air flow requirements, thereby reducing the power reduction that was previously required.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
an intake arrangement configured to intake charge air;
a compression ignition engine including a plurality of piston-cylinder sets configured to receive, ignite, and combust intake gas that includes the charge air from the intake arrangement to generate mechanical power and exhaust gas, wherein each of the piston-cylinder sets includes:
a cylinder defining an intake port and an exhaust port;
a piston positioned at least partially within the cylinder to form a combustion chamber, the combustion chamber being in fluid communication with the intake port and the exhaust port;
an intake valve configured to open and close the intake port;
an exhaust valve configured to open and close the exhaust port; and
a fuel injector configured to inject fuel into the combustion chamber; and
a controller having processing architecture executing programmed instructions to selectively command the intake valve and the exhaust valve such that,
during an exhaust stroke of the piston, the exhaust valve is opened to enable exhaust gas to flow out of the combustion chamber,
during an initial portion of an intake stroke of the piston, the intake valve is opened to enable the intake air to flow into the combustion chamber, and
during a further portion of the intake stroke of the piston, the intake valve is closed and the exhaust valve is opened to enable a portion of the exhaust gas to flow back into the combustion chamber in order to create thermally stratified layers of intake gas and exhaust gas within the combustion chamber.

2. The power system of claim 1, wherein the controller and exhaust valve form an internal exhaust gas recirculation (EGR) arrangement.

3. The power system of claim 1, wherein the compression ignition engine is configured to operate with a low cetane fuel.

4. The power system of claim 3, wherein the compression ignition engine is configured to operate with fuel having a cetane value of less than 40.

5. The power system of claim 1, wherein the thermally stratified layers of intake gas and exhaust gas include a layer with a temperature of at least 800° C.

6. The power system of claim 1, further comprising:
an exhaust arrangement configured to receive a first portion of the exhaust generated by the compression ignition engine;
an external EGR arrangement configured to receive a second portion of the exhaust generated by the compression ignition engine as EGR gas; and
a mixer configured to selectively receive and mix the EGR gas and the charge air as mixed gas.

7. The power system of claim 6, wherein the external EGR arrangement includes an EGR cooler configured to cool at least a first portion of the EGR gas.

8. The power system of claim 1, wherein the intake arrangement includes at least one compressor configured to receive and compress the charge air upstream of the mixer.

9. The power system of claim 8, wherein the exhaust arrangement includes at least one turbine driven by the first portion of the exhaust and rotationally coupled to drive the at least one compressor.

10. The power system of claim 1, wherein the engine further includes an intake manifold to direct the intake gas into the piston-cylinder sets and an exhaust manifold to receive the exhaust gas from the piston-cylinder sets, and wherein the controller is configured to manipulate a pressure difference between the exhaust manifold and the intake manifold in order to increase an impact of the portion of the exhaust gas flowing back into the combustion chamber during the further portion of the intake stroke.

11. A work vehicle, comprising:
a chassis;
a drive assembly supported on the chassis;
a power system supported on the chassis and configured to power the drive assembly, the power system comprising:
an intake arrangement configured to intake charge air; and
a compression ignition engine including a plurality of piston-cylinder sets configured to receive, ignite, and combust intake gas that includes the charge air from the intake arrangement to generate mechanical power and exhaust gas, wherein each of the piston-cylinder sets includes:
a cylinder defining an intake port and an exhaust port;
a piston positioned at least partially within the cylinder to form a combustion chamber, the combustion chamber being in fluid communication with the intake port and the exhaust port;
an intake valve configured to open and close the intake port;
an exhaust valve configured to open and close the exhaust port; and
a fuel injector configured to inject fuel into the combustion chamber; and
a controller having processing architecture executing programmed instructions to selectively command the intake valve and the exhaust valve such that,
during an exhaust stroke of the piston, the exhaust valve is opened to enable exhaust gas to flow out of the combustion chamber,
during an initial portion of an intake stroke of the piston, the intake valve is opened to enable the intake air to flow into the combustion chamber, and
during a further portion of the intake stroke of the piston, the intake valve is closed and the exhaust valve is opened to enable a portion of the exhaust gas to flow back into the combustion chamber in order to create thermally stratified layers of intake gas and exhaust gas within the combustion chamber.

12. The work vehicle of claim 11, wherein the controller and exhaust valve form an internal exhaust gas recirculation (EGR) arrangement.

13. The work vehicle of claim 11, wherein the compression ignition engine is configured to operate with a low cetane fuel.

14. The work vehicle of claim 13, wherein the compression ignition engine is configured to operate with fuel having a cetane value of less than 40.

15. The work vehicle of claim 11, wherein the thermally stratified layers of intake gas and exhaust gas include a layer with a temperature of at least 800° C.

16. The work vehicle of claim 11, further comprising:

an exhaust arrangement configured to receive a first portion of the exhaust generated by the compression ignition engine;

an external EGR arrangement configured to receive a second portion of the exhaust generated by the compression ignition engine as EGR gas; and a mixer configured to selectively receive and mix a first portion of the EGR gas and the charge air as mixed gas.

17. The work vehicle of claim 16, wherein the external EGR arrangement includes an EGR cooler configured to cool at least a first portion of EGR gas.

18. The work vehicle of claim 11, wherein the intake arrangement includes at least one compressor configured to receive and compress the charge air upstream of the mixer.

19. The work vehicle of claim 18, wherein the exhaust arrangement includes at least one turbine driven by the first portion of the exhaust and rotationally coupled to drive the at least one compressor.

20. The work vehicle of claim 11, wherein the engine further includes an intake manifold to direct the intake gas into the piston-cylinder sets and an exhaust manifold to receive the exhaust gas from the piston-cylinder sets, and wherein the controller is configured to manipulate a pressure difference between the exhaust manifold and the intake manifold in order to increase an impact of the portion of the exhaust gas flowing back into the combustion chamber during the further portion of the intake stroke.

* * * * *